Feb. 23, 1932.  S. SPEIRS  1,846,619
CULINARY SPRING TONGS
Filed Oct. 6, 1930
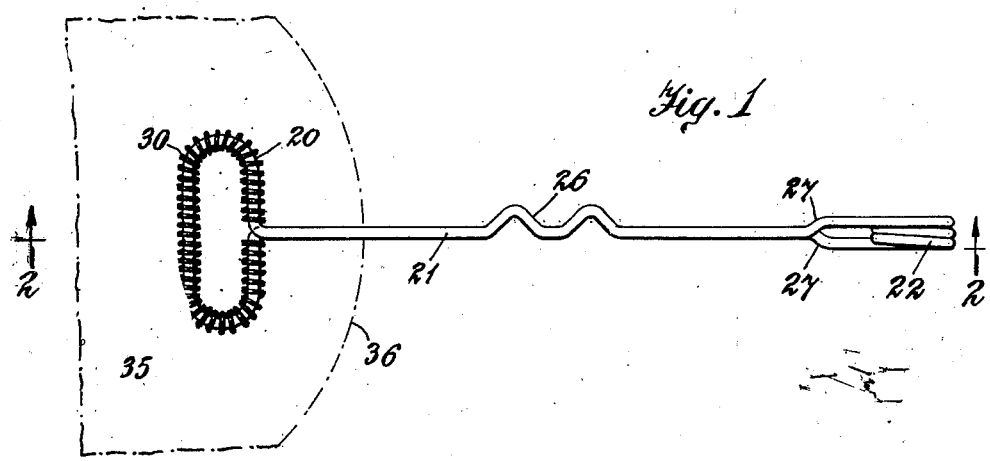
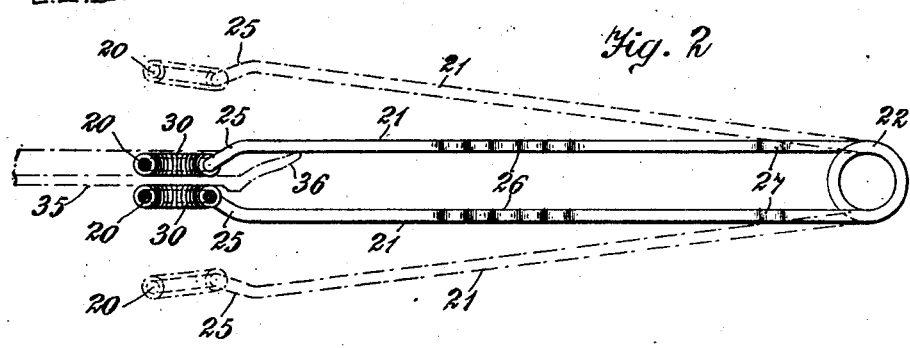
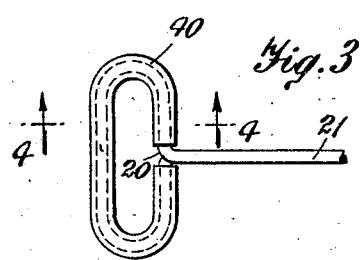
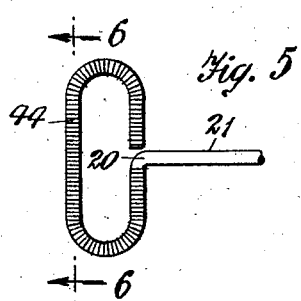
INVENTOR
Stuart Speirs
BY
ATTORNEY Patented Feb. 23, 1932

1,846,619

UNITED STATES PATENT OFFICE

STUART SPEIRS, OF NEW YORK, N. Y., ASSIGNOR TO STUART UTILITIES CORP., OF NEW YORK, N. Y., A CORPORATION OF NEW YORK

CULINARY SPRING TONGS

Application filed October 6, 1930. Serial No. 486,666.

This invention relates to improved culinary spring tongs.

The object of the invention is the production of spring tongs, by means of which various kitchen utensils such as plates, cups, glasses, knives, forks, wash rags and other objects can be easily clamped to be washed and cleaned.

The second object of the invention is the production of spring tongs which are easily manufactured at low cost, and which can be securely grasped to be adjusted to proper position, to clamp various objects. The third object of the invention is the production of tongs adapted to clamp objects without any tendency of said objects slipping.

In the accompanying drawings Fig. 1 represents a top view of an exemplification of the culinary spring tongs, clamping a plate indicated in dotted lines; Fig. 2 shows a side view of the tongs and section of Fig. 1 on the line 2, 2 in full lines, clamping a plate indicated in dotted lines, and the arms of the tongs in their open position indicated in dotted lines; Fig. 3 indicates a fragmentary portion of Fig. 1 with a modification; Fig. 4 is a section of Fig. 3 on the line 4, 4; Fig. 5 represents a fragmentary portion of Fig. 1 with a further modification, and Fig. 6 is an enlarged section of Fig. 5 on the line 6, 6.

The tongs in this instance is made of a piece of spring wire which at each of its ends has formed therewith the oval shaped loop 20. From each loop 20 extends an arm designated in its entirety by the numeral 21. The said arms are joined at one end by the spring coil 22. Each of the arms 21 has formed therewith the inclined off set portion 25, which inclines from the horizontal plane of its adjacent loop. Each of the arms 21 has formed therewith the zigzag portion 26, in about its central portion. The portions of the arms 21 adjacent to the spring coil 22 have each formed therewith the inclined off set portion 27 for the formation of said coil 22. A helical wire spring 30 is supported upon and wound around the members of each loop 20.

The inclined off set portions 25 space the arms 21, a requisite amount adjacent to the loops 20, to enable the tongs to clamp a plate 35, with its rim portion 36 located between said arms 21.

Referring to Figs. 3 and 4, the invention is modified by substituting a rubber tube 40 for the helical wire spring 30. The said rubber tubes tightly hug the members of each of the loops 20.

Referring to Figs. 5 and 6, the invention is again modified by forming teeth 44 in the adjacent faces of the loops 20. The said teeth 44 are substituted for helical wire springs 30 and the rubber tubes 40.

To use the tongs, the arms 21 of which are normally in their inclined and open position as indicated in dotted lines in Fig. 2, the user grasps said arms 21 over the zigzag portions 26 and forces the loops 20 with their appurtenances to bear against the opposite faces of the plate 35 or other object to be clamped, and when said object is to be released, the user releases the said arms 20.

Attention is called to the fact that the helical wire springs 30, the rubber tubes 40 and the teeth 44 bear against the opposite faces of the object clamped and frictionally engage and tightly clamp said object, and prevent its slipping.

Various modifications may be made in the invention and the present exemplification is to be taken as illustrative and not limitative thereof.

Having described my invention what I desire to secure by Letters Patent and claim is:

1. In spring tongs the combination of a spring wire constituting a pair of arms spaced from each other and normally inclined to each other, an inclined off-set portion formed in each arm, a loop formed in each arm extending from said off-set portions, a spring coil joining said arms and a helical wire spring supported upon each loop.

2. In spring tongs the combination of a spring wire constituting a pair of arms spaced from each other and normally inclined to each other, to position said arms in their open position, an inclined off-set portion formed in each arm adjacent to the end thereof, a loop formed in each arm, extending from said off-set portion, a zigzag portion formed in about the central portion of each arm, a spring coil joining said arms and a helical wire spring supported upon each loop.

3. In spring tongs the combination of a pair of arms, spaced from each other, a loop formed at one end of each arm, a spring coil joining the other ends of said arms and a helical wire spring supported upon each of said loops to frictionally engage an object to be clamped and supported by the tongs.

Signed at the borough of Manhattan, city of New York, in the county of New York and State of New York, this 2nd day of October, A. D. 1930.

STUART SPEIRS.